United States Patent [19]

Ulysse

[11] Patent Number: 5,495,794
[45] Date of Patent: Mar. 5, 1996

[54] VEGETABLE HOLDING UTENSIL

[76] Inventor: Clark Ulysse, 6930-54th Ave. N., Apt. 201, Minneapolis, Minn. 55428

[21] Appl. No.: 383,933

[22] Filed: Feb. 6, 1995

[51] Int. Cl.⁶ ................................................ A47J 37/04
[52] U.S. Cl. .................. 99/419; 99/421 A; 165/185; 294/61; 452/174; D7/359
[58] Field of Search ..................... 99/419, 421 A, 99/394, 532, 343; 24/711.2, 377; 452/174, 198; 411/452; 248/126, 175; 211/119, 125; 294/60, 61; 15/230.19; 165/185; D7/359, 683

[56] References Cited

U.S. PATENT DOCUMENTS

| | | | |
|---|---|---|---|
| D. 260,221 | 8/1981 | Lee et al. ............................... | D7/359 |
| 1,113,929 | 10/1914 | Brown .................................... | 452/174 |
| 1,308,253 | 7/1919 | Oftedahl ................................ | 248/126 |
| 1,485,253 | 2/1924 | Devlin ................................... | 99/419 |
| 1,890,907 | 12/1932 | Hoover .................................. | 99/419 |
| 2,557,890 | 6/1951 | Perry ..................................... | 294/61 |
| 2,651,251 | 9/1953 | Brown ............................... | 15/230.19 |
| 2,835,480 | 5/1958 | Perez ..................................... | D7/683 |
| 3,584,683 | 6/1971 | Gordon .................................. | 165/185 |
| 3,709,141 | 1/1973 | Schwartzstein ........................ | 99/343 |
| 4,176,592 | 12/1979 | Doyle, Jr. .............................. | 99/421 A |
| 4,258,617 | 3/1981 | Akwei ................................... | 99/419 |

*Primary Examiner*—Timothy F. Simone
*Attorney, Agent, or Firm*—Leo Gregory

[57] ABSTRACT

A hand held utensil adapted to hold a vegetable such as a potato for peeling, the device having a flange retaining the hand in a safe position and having an extension therebeyond securely holding the vegetable in position for peeling.

2 Claims, 1 Drawing Sheet

VEGETABLE HOLDING UTENSIL

BACKGROUND OF THE INVENTION

1. Field of Invention

This invention relates to the field of kitchen utensils and more particularly relates to a vegetable holding utensil.

2. Description of the Prior Art

Peeling or paring vegetables is a very common task in the preparation of food. Perhaps as common as any vegetable to be handled are potatoes to be peeled and carrots to be scraped and perhaps paring knives are the most widely used utensils for these purposes.

However the problem here in each case is that the vegetable must be hand held and care must be exercised not to cut or scrape a finger.

Tong like utensils are presently used but these are awkward in attempting to hold a vegetable with them and more often than not the vegetable slips from that hold.

It is desirable to have an appropriate hand held utensil which will conveniently and securely hold a vegetable such as a potato while it is being peeled by being inserted thereinto and such a utensil is provided by the invention herein.

SUMMARY OF THE INVENTION

This invention relates to a hand held kitchen utensil particularly adapted to securely hold a vegetable such as a potato while the vegetable is being peeled.

DESCRIPTION OF A PREFERRED EMBODIMENT

Figure 1:
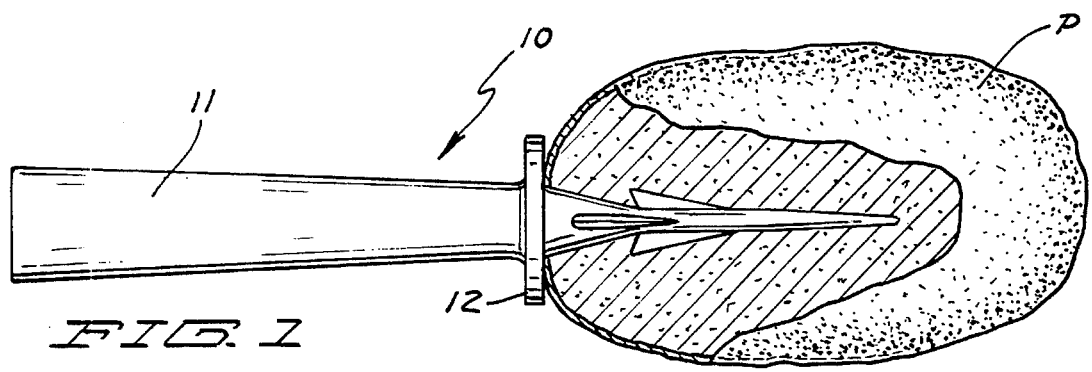
FIG. 1 is a side elevational view showing an invention in an operating position in connection with a potato.
Figure 2:
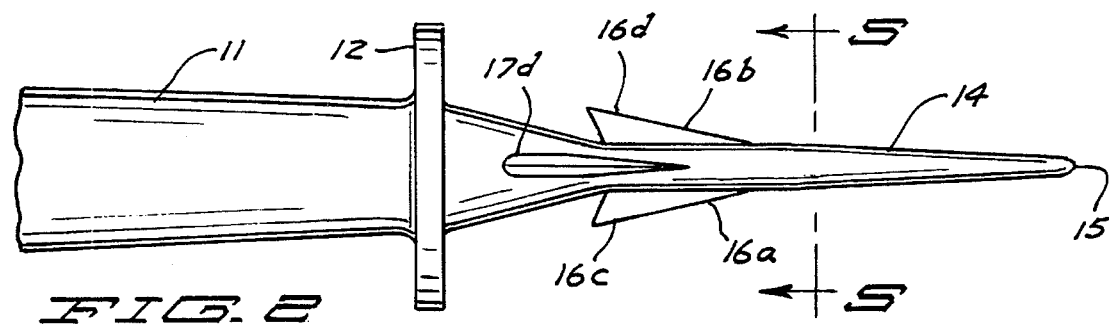
FIG. 2 is a side elevational view on a somewhat enlarged scale with reference to FIG. 1.
Figure 3:
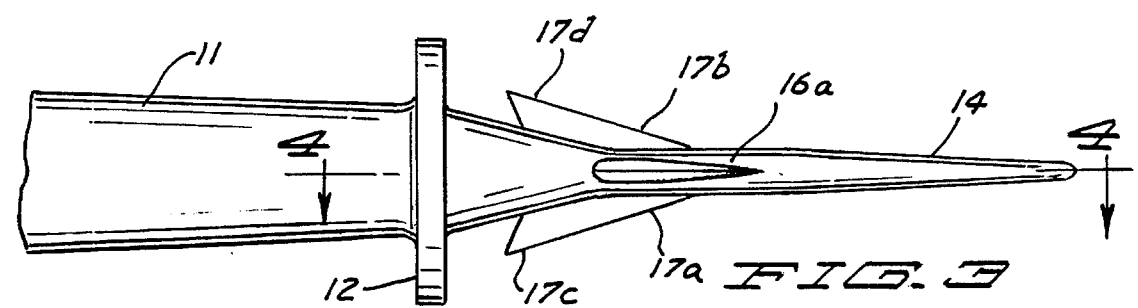
FIG. 3 is a view similar to that of FIG. 2 but being axially rotated 90°.
Figure 4:
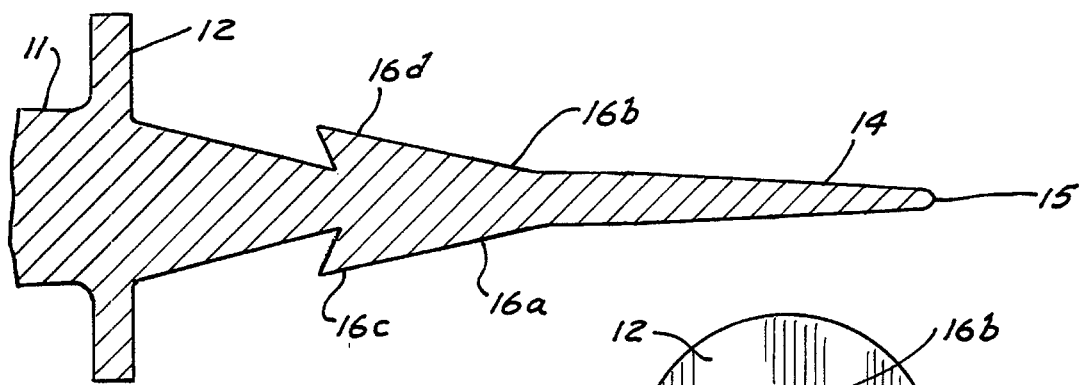
FIG. 4 is a view in longitudinal section taken on line 4—4 of FIG. 3.
Figure 5:
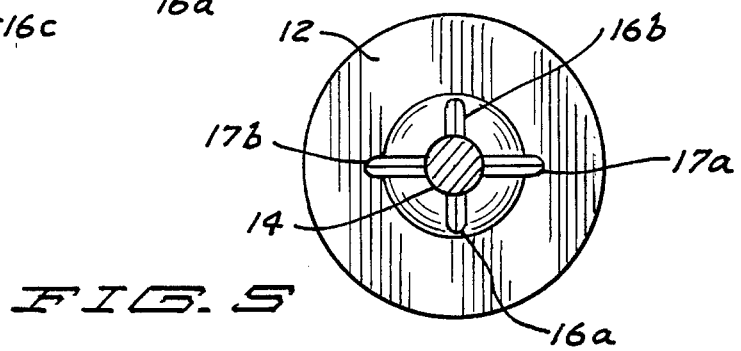
FIG. 5 is a view in cross section taken on line 4—4 of FIG. 3.

With reference to the drawings and particularly to FIG. 1, the invention herein comprises a unitary hand held vegetable holding utensil or device 10 shown disposed into a potato P.

Said device comprises a handle or hand gripping or holding portion 11 shown here as being a forwardly tapered cylinder of a size to easily fit into the palm of a hand being on the order of three or three and one half inches in length terminating in a circular protective flange 12 which is integral therewith.

Extending forwardly of said flange is a slender slightly tapered rod like projection 14 having a rounded tip 15 and being sufficiently tapered at its tip to readily penetrate a vegetable such as a potato. Here the length of said projection is on the order of two and one half inches which appears to be adequate for a sufficient penetration of the length of an average sized potato to securely hold the same.

Positioned rearwardly on said projection and extending outwardly of opposite sides thereof are transverse triangular like projections extending outwardly from each of opposed sides of said rod like projection as at 16a and 16b tapering forwardly and having rearward projecting shoulders 16c and 16d. Spaced above said pair of projections is a second pair of a like arrangement as at 17a and 17b having shoulders 17c and 17d.

Said projection 14 is disposed into a vegetable such as a potato up to said flange and said pairs of projections secure said potato in a securely held position.

More particularly to have its use concisely stated, this invention comprises a nicely hand held device having a circular flange preventing the hand from slipping forwardly and a slender rod like projection on the order of half of the length or more of an average potato penetrating the same with said shoulders preventing unintentional withdrawal of the device.

Thus, the operators hand is protected, the vegetable such as a potato is securely held and the commonly used peeling utensil may be applied in swift strokes. The preparation time has been reduced and the operator's hand is safe from any slippage of the peeling tool.

It will of course be understood that various changes may be made in the form, details, arrangement and proportions of the device without departing from the scope of the invention, which generally stated, consists of a device capable of carrying out the objects above set forth, such as disclosed and defined in the appended claims.

What is claimed is:

1. A vegetable holding device, comprising
   an elongated hand held member having a cylindrical handle, having an outer and an inner end,
   a circular flange integral with the inner end of said handle,
   a slender slightly tapered rod-like projection extending forwardly of said inner end of said handle,
   said projection terminating in a point adapted to penetrate a vegetable,
   a pair of triangular like projections extending from said rod like projection in opposed relation to each other and being tapered in the direction of said point of said rod like projection and having rearward upwardly extending shoulders,
   a second pair of said triangular like projections on said rod like projections extending above said first pair of projections and at right angles thereto,
   whereby upon being inserted into a vegetable said shoulders hold said vegetable onto said device.

2. A vegetable holding utensil, comprising
   a handle tapering toward its inner end,
   a circular flange at the inner end of said handle integral therewith,
   a slender tapered projection extending outwardly of said flange axially thereof,
   said extension ending in a point adapted to penetrate a vegetable,
   a pair of triangular like projections at opposed sides of said extension,
   said projections having upwardly angled shoulder portions tapering downwardly of said extension,
   a second like pair of projections at right angles to said first pair and spaced thereabove on said extension,
   whereby upon being inserted into a vegetable, said shoulder portions secure the held vegetable.

* * * * *